(12) United States Patent
Iwasa

(10) Patent No.: US 8,697,791 B2
(45) Date of Patent: Apr. 15, 2014

(54) OPTICAL MATERIAL AND OPTICAL ELEMENT

(75) Inventor: Hidefumi Iwasa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 681 days.

(21) Appl. No.: 12/555,253

(22) Filed: Sep. 8, 2009

(65) Prior Publication Data

US 2010/0076138 A1   Mar. 25, 2010

(30) Foreign Application Priority Data

Sep. 22, 2008   (JP) .................................. 2008-243190
Aug. 27, 2009   (JP) .................................. 2009-197418

(51) Int. Cl.
   *C08K 3/22*     (2006.01)
   *G02B 1/00*     (2006.01)

(52) U.S. Cl.
   USPC ............................ 524/406; 524/408; 524/430

(58) Field of Classification Search
   USPC ............. 524/406, 408, 430, 80; 528/373–391
   See application file for complete search history.

(56) References Cited

U.S. PATENT DOCUMENTS

| | | | | |
|---|---|---|---|---|
| 5,502,139 A * | 3/1996 | Toh et al. | ....................... | 526/284 |
| 5,670,603 A * | 9/1997 | Wu et al. | ....................... | 528/190 |
| 5,847,877 A | 12/1998 | Imamura et al. | ............... | 359/566 |
| 6,166,158 A * | 12/2000 | Toh et al. | ....................... | 526/308 |
| 6,759,471 B1 | 7/2004 | Ukuda | ........................... | 524/497 |
| 7,446,159 B1 * | 11/2008 | Samukawa et al. | ........... | 526/284 |
| 8,153,753 B2 | 4/2012 | Moriyama et al. | | |
| 2006/0106193 A1 | 5/2006 | Moriyama et al. | | |
| 2006/0246233 A1 * | 11/2006 | Fukuda | .......................... | 428/1.33 |
| 2007/0190314 A1 * | 8/2007 | Aiki et al. | ....................... | 428/327 |
| 2008/0161444 A1 * | 7/2008 | Hayashi et al. | .................. | 522/81 |
| 2008/0170295 A1 * | 7/2008 | Iwasa | ............................. | 359/566 |
| 2008/0260341 A1 * | 10/2008 | Shibata et al. | ................. | 385/129 |
| 2010/0048855 A1 * | 2/2010 | Kato et al. | ..................... | 528/201 |

FOREIGN PATENT DOCUMENTS

| | | | |
|---|---|---|---|
| JP | 06321543 A | * | 11/1994 |
| JP | 2005187661 A | * | 7/2005 |
| JP | 2006-022291 A | | 1/2006 |
| WO | 2004/039863 A1 | | 5/2004 |

OTHER PUBLICATIONS

Machine lagnuage translation of JP 2005187661 A.*
Machine lagnuage translation of JP 06321543 A.*

* cited by examiner

*Primary Examiner* — Robert D. Harlan
(74) *Attorney, Agent, or Firm* — Fitzpatrick, Cella, Harper & Scinto

(57) ABSTRACT

An optical material including a polymer of a mixture which contains a sulfur-containing compound, a fluorene compound with a fluorene skeleton, and an energy polymerization initiator. The sulfur-containing compound contains, in a molecule, at least one kind of group selected from the group consisting of a sulfide group, a sulphone group, a sulfoxide group, a thiol group, and a thioester group. A refractive index of the polymer of the mixture is 1.65 or more to less than 1.92, an Abbe constant thereof is 15 or more to less than 22, and a difference $\Delta\theta g,F$ between a secondary dispersion property $\theta g,F$ thereof and a secondary dispersion property $\theta g,F$ of a normal optical material which is expressed by $\theta g,F=0.6438-0.001682 vd$ is 0.05 or more to less than 0.13.

10 Claims, 6 Drawing Sheets

OPTICAL MATERIAL AND OPTICAL ELEMENT

BACKGROUND OF THE INVENTION

1. Field of the Invention

The present invention relates to an optical material and an optical element, and more particularly, to an optical material suitable to form an optical element used for an image pickup optical system of a camera.

2. Description of the Related Art

Up to now, an example of methods of correcting chromatic aberration of an optical system including only a refraction system is a method using a combination of glass materials having different dispersion properties. For example, an objective lens of a telescope includes a positive lens made of a glass material whose Abbe constant (vd) is large and a negative lens made of a glass material having a small Abbe constant. A combination of the positive lens and the negative lens is used to correct axial chromatic aberration. Therefore, when a lens structure or the number of lenses is limited or when used glass materials are limited, the chromatic aberration may not be sufficiently corrected. In order to correct such chromatic aberration, there has been known a method of controlling a refractive index and an Abbe constant to obtain, for example, a glass material having a high refractive index and a low Abbe constant.

In particular, U.S. Pat. No. 5,847,877 discloses that a heat-curable resin or a light-curable resin which is excellent to obtain a desired shape by the application of heat or light or a thermoplastic resin for extrusion molding has been used as an optical material including an organic compound.

In addition, U.S. Pat. No. 6,759,471 discloses that an organic-inorganic hybrid optical material having desired optical properties, which has been developed with the current progress of nanotechnology. According to the organic-inorganic hybrid optical material, ultra-fine particles of several nm to several tens nm are dispersed in a resin without being coagulated. Therefore, an optical material exhibiting optical properties which may not be realized by existing glass may be adjusted.

When an optical element which is excellent in chromatic aberration correction function and has an aspherical shape is to be manufactured, a case where a light-curable resin, a heat-curable resin, or a thermoplastic resin is molded on a spherical glass used as a base is more excellent in mass productivity, processability, and moldability than a case where an optical glass is used as a material. However, a plastic resin and a curable resin which normally each have a high refractive index and a small Abbe constant cause yellowing. That is, the resins cause yellowing because of a fundamental molecular structure, resin decomposition due to heating during processing or irradiation of energy such as ultraviolet light, or a change in molecular structure during reaction. An organic optical material used for the optical element is required to satisfy optical performance and at the same time to be more transparent.

In recent years, an organic-inorganic hybrid optical material has been proposed in which ultra-fine particles such as metal oxide particles are dispersed in an organic resin to mainly change optical properties. However, in order to improve a resin having general properties to have a desired property, an optical design is required to add a greater amount of fine particles and uniformly disperse the fine particles. When a greater amount of fine particles is added and the dispersibility of the fine particles is low, a transmittance reduces and an optical scattering property deteriorates. In a case of a hybrid material, as a refractive index difference between the organic resin and the fine particles increases, the harmful influence on the optical scattering property becomes larger, and hence it is said to be desirable to minimize the refractive index difference.

In contrast to this, the inventor of the present invention found that not only the high refractive index and the low Abbe constant but also a secondary dispersion property ($\theta g,F$) are important as material properties for providing the optical element with the chromatic aberration correction function. That is, a material having a secondary dispersion property larger than a general material (refractive index extraordinary dispersion property) is very effective for chromatic aberration correction in optical design.

FIG. 1A is a graph illustrating a relationship between the Abbe constant vd and the secondary dispersion property $\theta g,F$ in glass materials commercially available as optical materials. In FIG. 1A, the ordinate indicates the secondary dispersion property $\theta g,F$ and the abscissa indicates the Abbe constant vd. Normal optical glass materials have a property substantially on the line expressed by the following (Expression 1).

$$\theta g,F = 0.6438 - 0.001682 vd \quad \text{(Expression 1)}$$

FIG. 1B is a graph illustrating a relationship between the Abbe constant vd and a refractive index nd in materials commercially available as optical materials. In FIG. 1B, the ordinate indicates the refractive index nd and the abscissa indicates the Abbe constant vd.

In FIGS. 1A and 1B, optical materials having secondary dispersion properties larger than the secondary dispersion property obtained by (Expression 1) described above are expressed by a white square. Specifically, there are Vinylcarbazole (produced by Tokyo Chemical Industry Co., Ltd.) (nd=1.69, vd=17.9, and $\theta g, F=0.70$), UV1000 (produced by Mitsubishi Chemical Corporation) (nd=1.63, vd=23.3, and $\theta g,F=0.67$), HV153 (produced by ADELL Corporation) (nd=1.63, vd=25.0, and $\theta g,F=0.653$), and MPV (produced by Sumitomo Seika Chemicals Co., Ltd.) (nd=1.70, vd=17.4, and $\theta g,F=0.71$).

However, Vinylcarbazole may not be desirable as an optical material because of significant yellow coloring (yellowing) and a low transmittance. In addition to this, Vinylcarbazole has high brittleness and is likely to cause cracks during film formation, to thereby reduce moldability. UV1000 has a high transparent property, but a material cost thereof is extremely high and general versatility is low. HV153 is more transparent than Vinylcarbazole, but a material cost thereof is high and general versatility is low. A material cost of MPV is low, but a transmittance thereof is not sufficient for an optical element. Therefore, a single resin has not been found as a desired optical material having general versatility.

Comparisons among the physical properties and material costs of the four optical materials described above are illustrated in Table 1.

TABLE 1

| Commercially available optical materials | Optical property (exhibiting θg, F equal to or larger than that obtained by Expression 1) | Transmittance | Brittleness (crack) | Material cost | Total determination |
|---|---|---|---|---|---|
| Vinylcarbazole | Good | NG | NG | Good | NG |
| UV1000 | Good | Good | Good | NG | NG |
| HV153 | Good | Good | Good | NG | NG |
| MPV | Good | NG | Good | Good | NG |

SUMMARY OF THE INVENTION

The present invention has been made in view of the background technologies as described above. It is an object of the present invention to provide an optical material which has a high transmittance, a low optical scattering property, a high refractive index, a low Abbe constant (νd), a high secondary dispersion property (θg,F) (refractive index extraordinary dispersion property), and low brittleness. In particular, it is an object of the present invention to provide an optical material with a low material cost. It is another object of the present invention to provide an optical element using the optical material described above.

In order to achieve the above-mentioned objects, a first optical material according to the present invention includes a polymer of a mixture which contains: a sulfur-containing compound containing, in a molecule, at least one kind of group selected from the groups consisting of a sulfide group, a sulphone group, a sulfoxide group, a thiol group, and a thioester group; a fluorene compound at least having a fluorene skeleton; and an energy polymerization initiator, in which: the polymer of the mixture has a refractive index of 1.65 or more to less than 1.92 and an Abbe constant of 16 or more to less than 22; and a difference Δθg,F between a secondary dispersion property of the polymer of the mixture and a secondary dispersion property θg,F expressed by the following expression is 0.05 or more to less than 0.13, $$\theta g,F = 0.6438 - 0.001682\nu d$$

where νd is an Abbe constant.

A second optical material according to the present invention includes a polymer of a mixture which contains: a sulfur-containing compound containing, in a molecule, at least one kind of group selected from the group consisting of a sulfide group, a sulphone group, a sulfoxide group, a thiol group, and a thioester group; a fluorene compound at least having a fluorene skeleton; an energy polymerization initiator; and metal oxide fine particles, in which: the polymer of the mixture has a refractive index of 1.65 or more to less than 1.92 and an Abbe constant of 15 or more to less than 22; and a difference Δθg,F between a secondary dispersion property θg,F of the polymer of the mixture and a secondary dispersion property θg,F expressed by the above-mentioned expression is 0.05 or more to less than 0.13.

In the present invention, the Abbe constant νd and the secondary dispersion property θg,F are expressed by the following expressions.

$$\text{Abbe constant}(\nu d) = (nd-1)/(nF-nC)$$

$$\text{Secondary dispersion property}(\theta g,F) = (ng-nF)/(nF-nC)$$

where ng indicates a refractive index at a wavelength of 435.8 nm corresponding to a g line, nF indicates a refractive index at a wavelength of 486.1 nm corresponding to an F line, nd indicates a refractive index at a wavelength of 587.6 nm corresponding to a d line, and nC indicates a refractive index at a wavelength of 656.3 nm corresponding to a C line.

The respective physical property values such as the refractive index, the Abbe constant, and the secondary dispersion property of the optical material according to the present invention are values obtained by measurement in a state in which the optical material is cured. Normal measurement is performed in a state in which a liquid optical material is sandwiched between two glass substrates and cured as a thin film (approximately 1 mm). An internal transmittance and an optical scattering property of the present invention are measured in the same manner.

Further features of the present invention become apparent from the following description of exemplary embodiments with reference to the attached drawings.

DESCRIPTION OF THE EMBODIMENTS

Figure 1A:
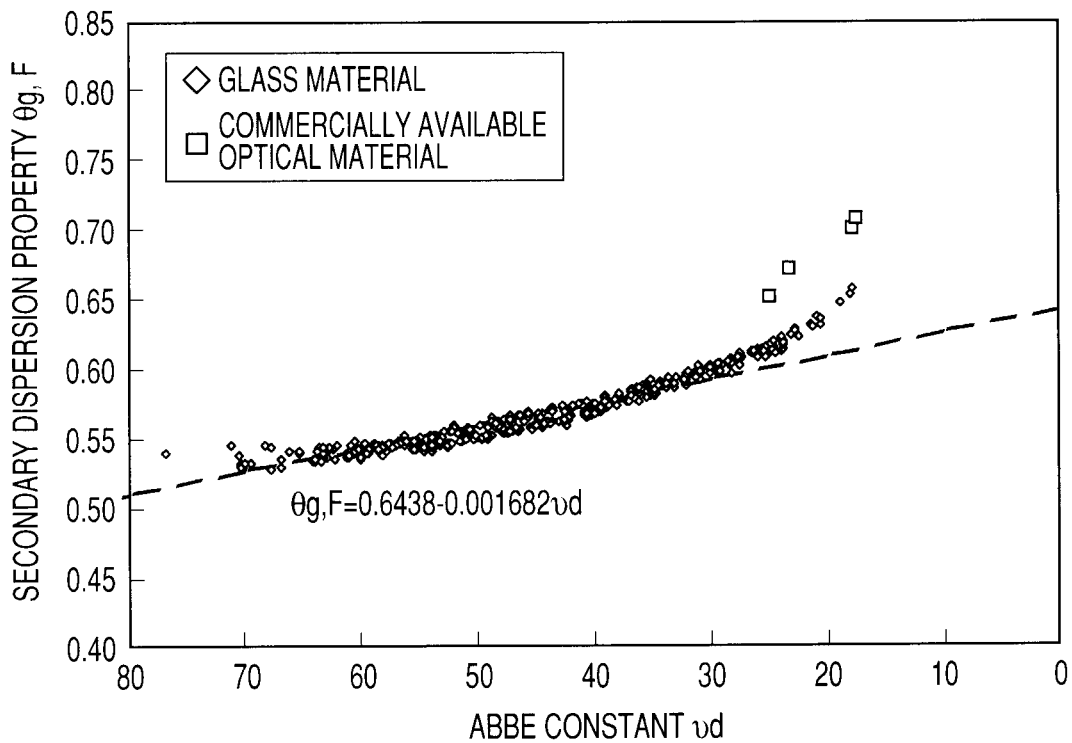
FIG. 1A is a graph illustrating a relationship between an Abbe constant and a secondary dispersion property in normal optical materials.
Figure 1B:
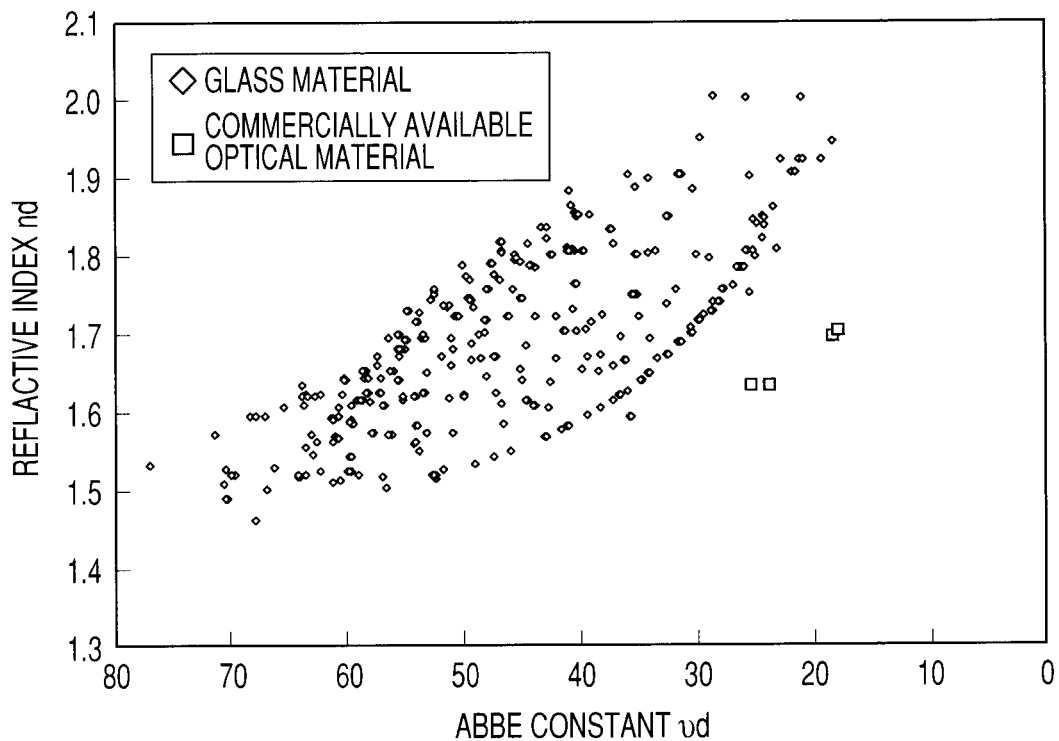
FIG. 1B is a graph illustrating a relationship between the Abbe constant and a refractive index in the normal optical materials.

An optical material according to the present invention has a high refractive index, a low Abbe constant, and a refractive index extraordinary dispersion property, which are equal to Vinylcarbazole, UV1000, HV153, and MPV described above. The optical material is excellent in internal transmittance and optical scattering rate and low in cost. This is realized, in the present invention, by mixing: a sulfur-containing compound containing, in a molecule, at least one kind of group selected from the group consisting of a sulfide group, a sulphone group, a sulfoxide group, a thiol group, and a thioester group; a fluorene compound at least having a fluorene skeleton; and an energy polymerization initiator. In this case, a refractive index of the optical material is 1.65 or more to less than 1.92, an Abbe constant thereof is 16 or more to less than 22, and a difference $\Delta\theta g,F$ between a secondary dispersion property $\theta g,F$ thereof and a secondary dispersion property $\theta g,F$ expressed by the following expression is 0.05 or more to less than 0.13, $$\theta g,F=0.6438-0.001682\nu d$$

where $\nu d$ is an Abbe constant.

Hereinafter, the present invention is described in detail.

(Embodiment 1)

A first optical material according to the present invention includes a polymer of a mixture which at least contains a sulfur-containing compound, a fluorene compound, and an energy polymerization initiator.

(Sulfur-Containing Compound)

The sulfur-containing compound included in the first optical material according to the present invention is a compound containing, in a molecule, at least one kind of group selected from the group consisting of a sulfide group, a sulphone group, a sulfoxide group, a thiol (mercaptan) group, and a thioester group. In particular, in order to obtain a resin which may be cured by energy such as light or heat, the compound desirably contains a polymerizable functional group such as an acrylic group, a vinyl group, or an epoxy group.

Specific examples of the sulfur-containing compound include bis(4-vinylthiophenyl)sulfide, bis(4-methacryloylthiophenyl)sulfide, p-bis[β-(meth)acryloyloxyethylthio]xylylene, 4,4'-bis[β-(meth)acryloyloxyethylthio]diphenylsulfone, 1,2-dimercaptoethane, 1,3-dimercaptopropane, 1,4-dimercaptobutane, 1,6-dimercaptohexane, bis(2-mercaptoethyl)sulfide, 1,2-bis(2-mercaptoethylthio)ethane, 2-mercaptomethyl-1,3-dimercaptopropane, 2-mercaptoethyl-1,4-dimercaptobutane, 2-(2-mercaptoethylthio)-1,3-dimercaptopropane, 1,2-bis(2-mercaptoethylthio)-3-mercaptopropane, 1,1,1-tris(mercaptomethyl)propane, tetrakis(mercaptomethyl)methane, ethyleneglycol bis(2-mercaptoacetate), ethyleneglycol bis(3-mercaptopropionate), 1,4-butanediol bis(2-mercaptoacetate), 1,4-butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,4-dimercaptocyclohexane, 1,3-dimercaptocyclohexane, 1,4-bis(mercaptomethyl)cyclohexane, 1,3-bis(mercaptomethyl)cyclohexane, 2,5-bis(mercaptomethyl)-1,4-dithiane, 2,5-bis(2-mercaptoethyl)-1,4-dithiane, 2,5-bis(mercaptomethyl)-1-thiane, 2,5-bis(2-mercaptoethyl)-1-thiane, 1,4-dimercaptobenzene, 1,3-dimercaptobenzene, 1,4-bis(mercaptomethyl)benzene, 1,3-bis(mercaptomethyl)benzene, bis(4-mercaptophenyl)sulfide, bis(4-mercaptophenyl)ether, 2,2-bis(4-mercaptophenyl)propane, bis(4-mercaptomethylphenyl)sulfide, bis(4-mercaptomethylphenyl)ether, and 2,2-bis(4-mercaptomethylphenyl)propane. A polymer of the compounds may be used. Only one of the compounds may be used or a combination of two or more of the compounds may be used. The sulfur-containing compound is desirably excellent in compatibility and copolymerization reactivity with another compound included in the mixture.

(Fluorene Compound)

The fluorene compound at least having the fluorene skeleton, which is included in the optical material according to the present invention, desirably contains a polymerizable functional group such as an acrylic group, a vinyl group, or an epoxy group. Examples of the compound desirably include a compound containing a polymerizable functional group as expressed by the following chemical formula (1) and a compound containing a polymerizable functional group as expressed by the following chemical formula (2). A polymer of the compounds may be used. Only one of the compounds may be used or a combination of two or more of the compounds may be used.

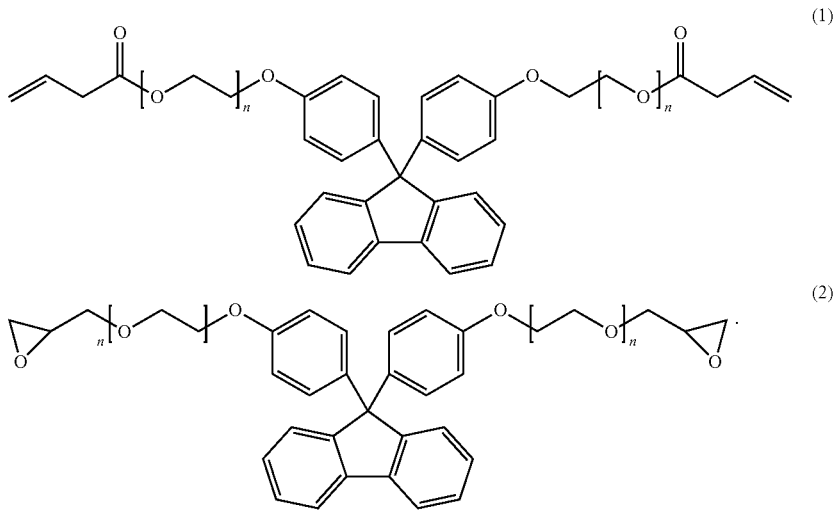

(Crosslinking Agent)

The mixture of the optical material according to the present invention may be added with a crosslinking agent, as required. Therefore, a heat resistance, a mechanical property, an elastic coefficient, and reactivity may be adjusted. In this case, it is necessary to add the crosslinking agent in consideration of a change in optical property. In order to mold a molded member with the optical material according to the present invention, it is desirable to add various release agents.

(Mixing Ratio between Sulfur-containing Compound and Fluorene Compound)

A desired content of the sulfur-containing compound included in the first optical material according to the present invention is 30% by weight or more to 85% by weight or less, desirably, 45% by weight or more to 75% by weight or less. A desired content of the fluorene compound included in the first optical material according to the present invention is 15% by weight or more to 70% by weight or less, desirably, 25% by weight or more to 55% by weight or less.

Though depending on a selected molecular structure (type) of the sulfur-containing compound, when the content of the sulfur-containing compound is larger than 75% by weight, this causes mainly yellowing, and hence a transmittance may reduce. When the content of the sulfur-containing compound is smaller than 45% by weight, a desired optical property, particularly, a secondary dispersion property difference $\Delta\theta g,F$ is not finally obtained. When the content of the fluorene compound is larger than 70% by weight, a desired secondary dispersion property difference $\Delta\theta g,F$ is not particularly obtained. When the content of the fluorene compound is smaller than 15% by weight, a reduction in transmittance occurs.

(Energy Polymerization Initiator)

In order to polymerize the sulfur-containing compound and the fluorene compound, the energy polymerization initiator is used for the optical material according to the present invention. A photopolymerization initiator or a thermal polymerization initiator is used as the energy polymerization initiator. A combination of the photopolymerization initiator and the thermal polymerization initiator may be used.

In the case where a photopolymerizable resin is used in the present invention, as the photopolymerization initiator, a radical polymerization initiator is used to utilize a radical formation mechanism based on photoirradiation. In general, the initiator is desirably used for molding a replica of a lens or the like. Desirable specific examples of the photopolymerization initiator include 2-benzyl-2-dimethylamino-1-(4-morpholinophenyl)-1-butanone, 1-hydroxy-cyclohexyl-phenylketone, 2-hydroxy-2-methyl-1-phenyl-propan-1-one, bis (2,4,6,-trimethylbenzoyl)-phenylphosphineoxide, 4-phenylbenzophenone, 4-phenoxybenzophenone, 4,4'-diphenylbenzophenone, and 4,4'-diphenoxybenzophenone. Note that, the ratio of the photopolymerization initiator to be added to a polymerizable resin component may be appropriately selected depending on the irradiation level and additional heating temperature, and may also be adjusted depending on the desired average molecular weight of a polymer produced. In the case where the initiator is used for curing and molding of the optical materials according to the present invention, the amount of the photopolymerization initiator to be added to the polymerizable component is desirably selected from the range between 0.01 and 10.00 wt %. The photopolymerization initiator may be used singly or two or more kinds thereof may be used in combination depending on the reactivity to the resin or wavelength of the irradiated light.

In addition to the radical polymerization initiator, a cationic polymerization initiator may also be used to utilize a cation formation mechanism based on photoirradiation. The cationic polymerization initiator is desirably used for film formation or molding in the case where oxygen inhibition should be more taken into consideration. A typical example of the photopolymerization initiator includes Irgacure 250, which exhibits excellent curing properties and shows a few sign of yellowing by exposure to a sufficient amount of ultraviolet light when a high content of titanium oxide is contained as metal oxide fine particles as explained later. Specific example of the cation polymerization initiator is shown above, but the initiator is not limited thereto. The thermal polymerization initiators may be used singly or two or more kinds may be used in combination.

In the case where a thermally polymerizable resin is used in the present invention, as the thermal polymerization initiator, a radical polymerization initiator may be used to utilize a radical formation mechanism based on heating. In general, the initiator is desirably used for molding a replica of a lens or the like. Desirable examples of the thermal polymerization initiator include azobisisobutyronitrile (AIBN), benzoyl peroxide, t-butyl peroxypivalate, t-butyl peroxyneohexanoate, t-hexyl peroxyneohexanoate, t-butyl peroxyneodecanoate, t-hexyl peroxyneodecanoate, cumyl peroxyneohexanoate, and cumyl peroxyneodecanoate. Note that, the ratio of the thermal polymerization initiator to be added to a polymerizable component may be appropriately selected depending on the heating temperature and oxygen content in molding. In addition, the ratio may be adjusted depending on the desired polymerization degree of a molded article produced. In the case where the initiator is used for curing and molding of the optical materials according to the present invention, the amount of the thermal polymerization initiator to be added to the polymerizable component is desirably selected from the range between 0.01 and 10.00 wt %. The thermal polymerization initiator may be used singly or two or more kinds thereof may be used in combination depending on the reactivity to the resin or the desired heating temperature.

(Manufacturing Method)

Next, a method of manufacturing the first optical material according to this embodiment is described with reference to a typical case where the first optical material contains a photopolymerizable resin component using a radical generation mechanism induced by light.

The sulfur-containing compound, the fluorene compound with the fluorene skeleton, the energy polymerization initiator, the crosslinking agent (as required), and the release agent (as required) are mixed at a mixing ratio of the respective components and dissolved to obtain a mixture of only resin. Therefore, the resin mixture of only resin which has a high transmittance, a high refractive index, a low Abbe constant, and a high secondary dispersion property may be obtained as the first optical material according to the present invention.

Next, a method of molding, on a substrate made of a light transmission material such as glass, an optical element having a layer structure obtained by photopolymerizing the first optical material is described with reference to FIGS. 2A to 2D. For ease of description, FIGS. 2A to 2D illustrate an example of not an optical element having a curved surface but an optical element having a flat shape.

Figure 2A:
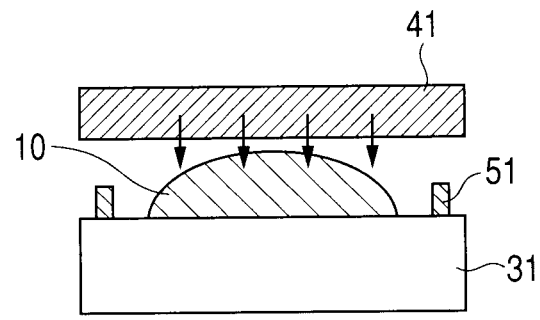
FIGS. 2A, 2B, 2C, and 2D are cross sectional views illustrating a method of manufacturing a molded member in Example 1.
Figure 2B:
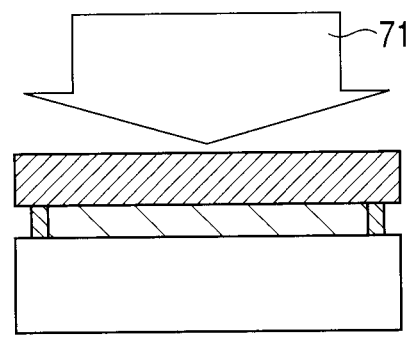

Firstly, a first optical material 10 having flowability is caused to flow into between a glass substrate 41 and a flat-shaped mold 31 which is opposed to the glass substrate 41 and made of a metal material. Next, as illustrated in FIG. 2A, the optical material 10 is loaded by the glass substrate 41, and the optical material 10 is expanded and filled in a gap among the glass substrate 41, the flat-shaped mold 31, and a spacer 51. Next, as illustrated in FIG. 2B, the optical material 10 is irradiated with ultraviolet light 71 through the glass substrate 41 to photopolymerize the optical material 10. The light used for the irradiation causing photopolymerization reaction is light having a suitable wavelength corresponding to a mechanism causing radical generation using the photopolymerization initiator. In some cases, not the ultraviolet light but visible light may be used. The optical material 10 including a monomer is desirably uniformly irradiated with light. The amount of irradiation of light is selected as appropriate correspondingly to the mechanism causing radical generation using the photopolymerization initiator or correspondingly to a content ratio of the contained photopolymerization initiator.

Figure 2C:
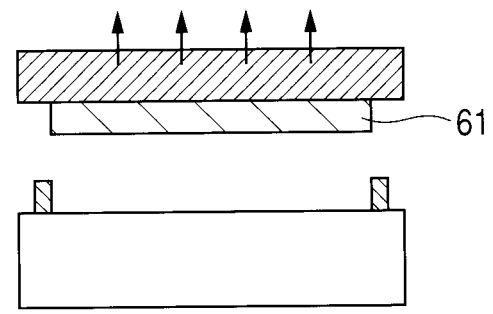
Figure 2D:
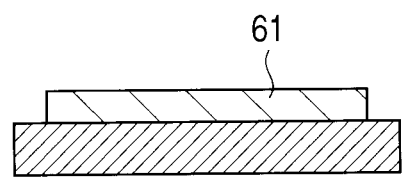

According to the photopolymerization reaction of the optical material 10 in FIG. 2B, a molded member 61 made of the optical material 10 is bonded to the glass substrate 41. In FIG. 2C, the molded member 61 integrally formed with the glass substrate 41 is released from the flat-shaped mold 31. The released molded member 61 and the glass substrate 41 are annealed to produce an optical element illustrated in FIG. 2D.

The molded member may be manufactured by a thermal polymerization method. In this case, a temperature of the entire molded member is desirably made more uniform. A reduction in total thickness of the molded member made of the optical material formed on the light transmission material used for the substrate is more suitable for the present invention. When the total thickness of the molded member made of the optical material is made large, it is necessary to select the amount of irradiation, an irradiation intensity, and a light source in further consideration of film thickness, the absorption of resin components, and the absorption of fine particle components.

According to the optical material of the present invention, the resin composition mixture of only resin exhibits the high refractive index, the low Abbe constant, and the high secondary dispersion property, and hence the chromatic aberration may be efficiently removed. Therefore, an optical system may be further reduced in weight and length. The resin composition mixture of the optical material according to the present invention has the high transmittance. The requirements described above are desirable to apply to a desired optical element. The resin composition mixture may be used as a resin which may be cured by energy such as ultraviolet light. When a molding tool such as a mold is used, a complex-shaped optical element may be manufactured in a shorter time.

EXAMPLE 1

Bis(4-vinylthiophenyl)sulfide (MPV) which is the sulfur-containing compound and the fluorene compound which is expressed by the chemical formula (1) and has the fluorene skeleton were compatibly mixed at weight ratios of 1:1, 1.5:1, 2:1, and 2.5:1. A photo radical polymerization initiator, 2-hydroxy-2-methyl-1-phenyl-propan-1-one was added to each of the resin component mixtures at 3% by weight to obtain an optical material 11 (weight ratio is 1:1), an optical material 12 (weight ratio is 1.5:1), an optical material 13 (weight ratio is 2:1), and an optical material 14 (weight ratio is 2.5:1), which each are made of only resin in the present invention.

Next, molded members were obtained from the optical materials 11 to 14 by the manufacturing steps illustrated in FIGS. 2A to 2D. As illustrated in FIGS. 2A to 2D, each of the optical materials 11 to 14 was sandwiched and fixed between the flat-shaped mold 31 and the glass substrate 41 using the spacer 51 (1 mm in thickness). Then, the ultraviolet light 71 (total irradiation amount: 10 J) was emitted from above the glass substrate 41 to obtain the molded member 61 having a thickness of 1 mm. After that, the obtained molded member 61 was annealed at 90° C. for 7 hours.

Figure 3A:
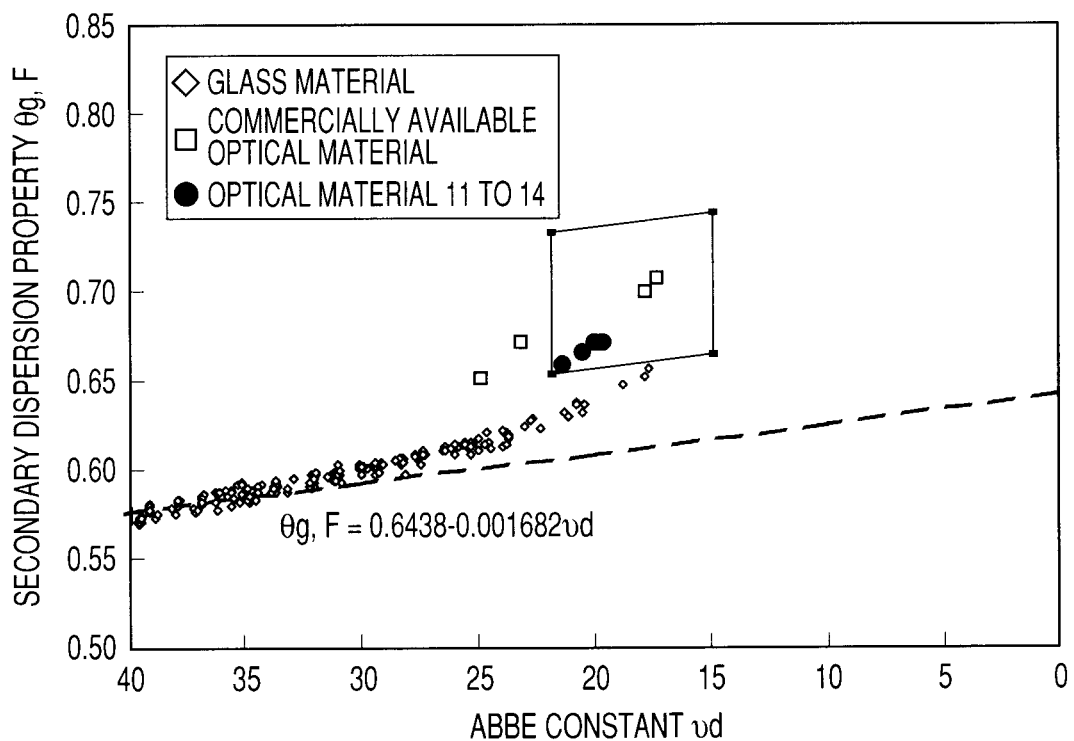
FIG. 3A is a graph illustrating a relationship between the Abbe constant and the secondary dispersion property in Example 1.
Figure 3B:
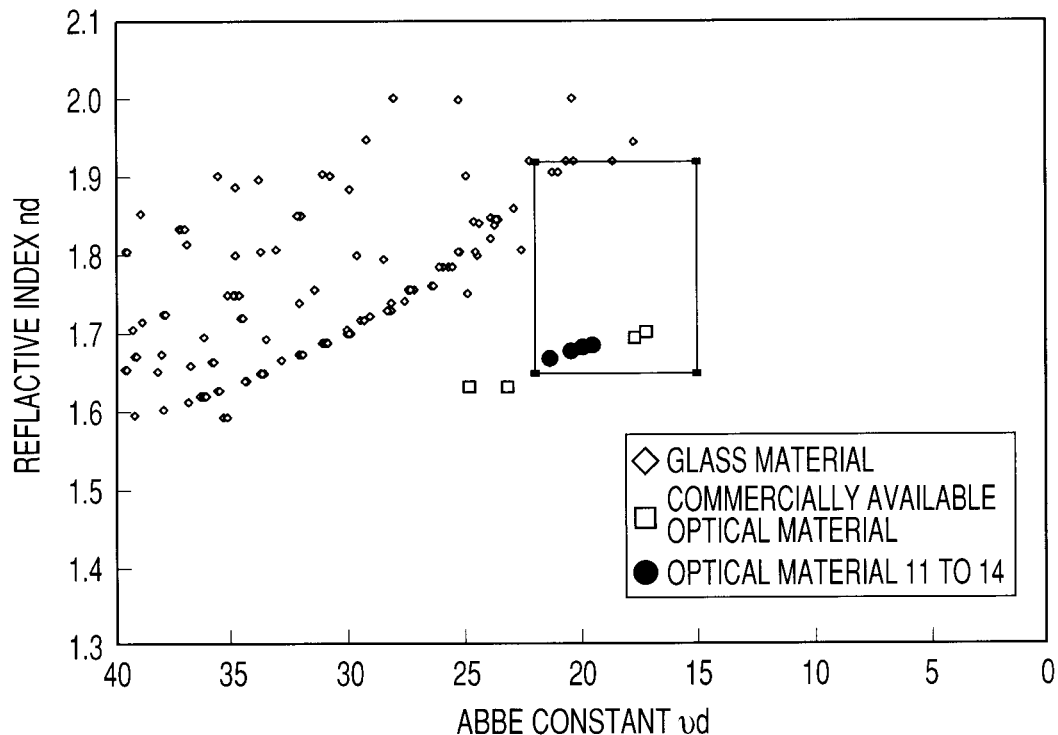
FIG. 3B is a graph illustrating a relationship between the Abbe constant and the refractive index in Example 1.

Relationships among the refractive index nd, the Abbe constant vd, and the secondary dispersion property θg,F in the molded members are illustrated in Table 2 and FIGS. 3A and 3B. Results obtained by measurement on the internal transmittance and the optical scattering rate are illustrated in Table 2. When the difference between the secondary dispersion property θg,F in this example and the secondary dispersion property θg,F in (Expression 1) described above is expressed by Δθg,F, the secondary dispersion property difference Δθg,F of each of the optical materials 11 to 14 is in a range of $0.05 \leq \Delta\theta g,F \leq 0.07$. The refractive index nd is in a range of $1.66 \leq nd \leq 1.69$. The Abbe constant vd is in a range of $19 \leq vd \leq 22$.

(Embodiment 2)

A second optical material according to the present invention includes a mixture which at least contains the sulfur-containing compound, the fluorene compound, the polymerization initiator, and metal oxide fine particles. Note that the sulfur-containing compound, the fluorene compound, and the polymerization initiator are the same as in Embodiment 1.

(Metal Oxide Fine Particles)

Specific examples of the metal oxide fine particles included in the second optical material according to the present invention can include a titanium oxide, a niobium oxide, a tantalum oxide, and a tungsten oxide. Specifically, $TiO_2$, NbO, $Nb_2O_5$, $Ta_2O_5$, or $WO_3$ is used. If necessary, the metal oxide fine particles may be complex oxide fine particles with Si, Ti, Sn, Zr, or Al. In the following description, the "metal oxide fine particles" are also referred to as the "fine particles".

An average particle diameter of the metal oxide fine particles is desirably a particle diameter which does not adversely affect a light transmittance and optical scattering. The average particle diameter is 30 nm or less, desirably 2 nm or more to 30 nm or less, more desirably 2 nm or more to 20 nm or less. In a case where a particle diameter distribution is wide and a volume fraction ratio of particles having a particle diameter larger than 30 nm to all fine particles is 5% by volume or more, including a case where the fine particles are aggregated, the optical scattering is significantly adversely affected. Therefore, a median diameter D95 is desirably 30 nm or less, particularly 20 nm or less.

When, out of the metal oxide fine particles, fine particles having a large particle diameter are to be removed, the fine particles are dispersed in a solvent before an organic resin component is mixed (slurry state), the organic resin component is dissolved in the slurry, or the solvent may be removed from the slurry state to produce a non-solvent system including the organic resin component and the fine particles though this may be possible or impossible depending on viscosity. In any state, filtering is suitably performed using a filter having small holes with a size relatively smaller than a particle size for removal to remove unnecessary large fine particles. It is also desirable to use a collision dispersion processing machine such as a beads mill or a jet mill to improve the dispersion property of the fine particles. The processing performed for an excessively short time or an excessively long time may damage the dispersion property, and hence it is necessary to determine an optimum condition based on the type of fine particles, a fine particle diameter, surface treatment, a resin, a dispersion agent, and a solvent.

The metal oxide fine particles are desirably subjected to any surface treatment as required. The surface treatment may be performed during a stage for synthetically preparing the fine particles or may be separately performed after the fine particles are obtained.

The metal oxide fine particles may be only one type or a combination of two or more types, which are used based on finally required properties. The content of the metal oxide fine particles included in the optical material according to the present invention is desirably 1% by volume or more to 50% by volume or less, more desirably 5% by volume or more to 20% by volume or less. When the content of the metal oxide fine particles is excessively large, it may be difficult to ensure a high transmittance because of the absorption property of the metal oxide fine particles or a reduction in optical dispersion property may occur.

(Dispersion Solvents)

Examples of dispersion solvents which disperse metal oxide fine particles include, but are not limited to, organic solvents such as: aromatic hydrocarbons such as toluene, benzene, and xylene; alcohols such as ethanol and isopropanol; alicyclic hydrocarbons such as cyclohexane, acetic acid esters such as ethyl acetate and butyl acetate; ketones such as acetone and methyl ethyl ketone; amides such as dimethylformamide, dimethylacetamide, and N-methyl-2-pyrrolidone; aliphatic hydrocarbons such as hexane and octane; ethers such as diethylether and butylcarbitol; and halogenated hydrocarbons such as dichloromethane and carbon tetrachloride. The dispersion solvent may be selected based on the affinity of the used metal oxide fine particles, the affinity of a surface treatment agent, and the affinity of a dispersion agent. The used organic solvent may be only one type or a combination of two or more types unless no dispersion property is damaged.

(Surface Treatment Agent)

In the present invention, in order to uniformly disperse the metal oxide fine particles such that the metal oxide fine particles are prevented from being aggregated, it is suitable to use the surface treatment agent or the dispersion agent (surface active agent). It is generally known that, when the surface treatment agent or the dispersion agent is used to disperse the metal oxide fine particles in a solvent or a resin, completely different dispersion states are exhibited based on an added surface treatment agent, the type of dispersion agent, an additive amount, a molecular weight, polarity, and affinity. A pigment derivative, a resin type, or an active agent type may be suitably used as the surface treatment agent or the dispersion agent for the present invention. Here, as the surface treatment agent or the dispersant, cationic, weak cationic, nonionic, or amphoteric surfactants are effective. Specifically, polyester-type, ε-caprolactone-type, polycarboxylate, polyphosphate, hydrostearate, amide sulfonate, polyacrylate, olefin-maleate copolymer, acrylic-maleate copolymer, alkylamine acetate, alkyl fatty acid salt, polyethylene glycol fatty acid ester-type, silicone-type, and fluorine-type can be used. However, in the present invention, it is suitable to use at least one kind of basic type chosen from ammonia or organic amines. Specific examples thereof include, PO or EO modified alkylamines such as Disperbyk 161, 162, 163, and 164 from the Disperbyk Series (produced by BYK Japan KK), Solsperse 3000, Solsperse 9000, Solsperse 17000, Solsperse 20000, Solsperse 24000, and Solsperse 41090 from the Solsperse series (produced by Zeneca, Inc.), and TAMN 15 from the TAMN series (produced by Nikko Chemicals, Co., Ltd.).

An additive amount of surface treatment agent or an additive amount of dispersion agent is changed based on mainly the type of the surface treatment agent or the dispersion agent, the type of the fine particles, a surface area (fine particle diameter) of the fine particles, or the type of dispersion solvent such as the type of dispersion resin for mixing the fine particles therein. In the present invention, the additive amount of surface treatment agent or the additive amount of dispersion agent is desirably 0.1% by weight or more to 25.0% by weight or less, with respect to the weight of the metal oxide fine particles. When the additive amount of dispersion agent is excessively large, white turbidity may occur to cause optical scattering. In addition to this, the properties (such as refractive index, Abbe constant, secondary dispersion property, and elastic coefficient) of the mixture obtained by mixing the fine particles therein are reduced more than necessary. Therefore, the additive amount of dispersion agent is more suitably 4.0% by weight or more to 20.0% by weight or less. The dispersion agent may be only one type or a combination of two or more types.

(Manufacturing Method)

Next, a method of manufacturing the second optical material according to this embodiment is described with reference to a typical case where the second optical material contains a photopolymerizable resin component using a radical generation mechanism induced by light.

Firstly, an adequate amount of surface treatment agent or dispersion agent is dissolved in a solvent and added with the metal oxide fine particles which is subjected to surface treatment in advance, to obtain a uniform fine particle dispersion solution (slurry). After that, the mixture of only resin which is photopolymerizable as described above is dissolved. When the resin component is to be dissolved in the slurry, it is desirable to use a combination of a solvent, a surface treatment agent, and a dispersion agent to minimize the deterioration of the dispersion state of the metal oxide fine particles due to the addition of the resin component. If necessary, filtering processing or dispersion processing using a machine such as a beads mill may be performed to remove aggregated fine particles or disperse the aggregated fine particles again. After the resin component is completely dissolved, when it is confirmed that the metal oxide fine particles are precipitated and suitably dispersed, the solvent is removed using an evaporator. In this case, it is desirable to suitably adjust the degree of reduced pressure based on the boiling point of the solvent and a residual solvent amount. The degree of aggregation of the fine particles may deteriorate because of rapid evaporation or removal of the solvent, to thereby impair the dispersion property. When the solvent is to be removed by reduced pressure, heating may be performed as required to the degree to which the dispersion property is not impaired. In this manner, the second optical material according to the present invention is obtained. The obtained optical material may contain a residual solvent which is left without being removed. Durability and optical properties of a resultant molded product may be affected depending on a content ratio of the residual solvent. Therefore, the content ratio of the residual solvent is desirably in a range of 0.001% by weight to 0.50% by weight, with respect to a weight obtained by subtracting a solvent weight from a total weight. When the degree of reduced pressure is excessively high, when heating is performed simultaneously with the reduction in pressure, or when a reduced pressure process is performed for a long time, it is likely to remove, by evaporation, the surface treatment agent, the dispersion agent, and a monomer such as the resin component, which are added together with the solvent. Thus, it is necessary to adjust the degree of reduced pressure, a temperature, and a time in consideration of each molecular weight, each boiling point, and each sublimation property.

Next, as in the case of Embodiment 1, an optical element having a layer structure obtained by photopolymerizing the second optical material is molded on a substrate made of a light transmission material such as glass.

According to the second optical material of the present invention, when ultra-fine particles of metal oxide are added for requirements to changes in optical properties, desired refractive index, Abbe constant, and secondary dispersion property may be changed. According to the second optical material of the present invention, the resin composition mixture of only resin exhibits the high refractive index, the low Abbe constant, and the high secondary dispersion property.

Therefore, an additive amount of fine particles may be further reduced in order to improve the desired properties depending on the metal oxide fine particles. The refractive index of the organic resin added with the metal oxide fine particles is sufficiently high, and hence a refractive index difference with the metal oxide fine particles used in the present invention may be further reduced. Thus, the influence of the optical scattering due to the refractive index difference between the metal oxide fine particles and the resin may be minimized. The optical element using the obtained optical material is excellent in environmental reliability.

EXAMPLE 2

Firstly, Disperbyk 163 (product name, produced by BYK Japan KK) which is the dispersion agent and $TiO_2$ fine particles having an average particle diameter of 15 nm were mixed in methyl isobutyl ketone (MIBK) such that Disperbyk 163 becomes 1.5% by weight and the $TiO_2$ fine particles becomes 10% by weight, and then compatibly dispersed to obtain a fine particle dispersion solution. After that, the obtained fine particle dispersion solution was processed for 8 hours using a beads mill provided with $ZrO_2$ beads having an average particle diameter of 30 μm. The $ZrO_2$ beads were removed by filtering to obtain a $TiO_2$ fine particle dispersion slurry with an MIBK solvent.

Of the optical materials obtained in Example 1, the optical material 13 was added with the $TiO_2$ fine particle dispersion slurry and compatibly mixed therewith and the solvent was removed by an evaporator. A volume ratio of the $TiO_2$ fine particle to the optical material 13 was adjusted so as to be 5% by volume, 10% by volume, and 15% by volume. Then, optical materials 15, 16, and 17 were obtained.

In the same manner as in Example 1, molded members having a thickness of 1 mm were obtained from the optical materials 15, 16, and 17, and then annealed.

Figure 4A:
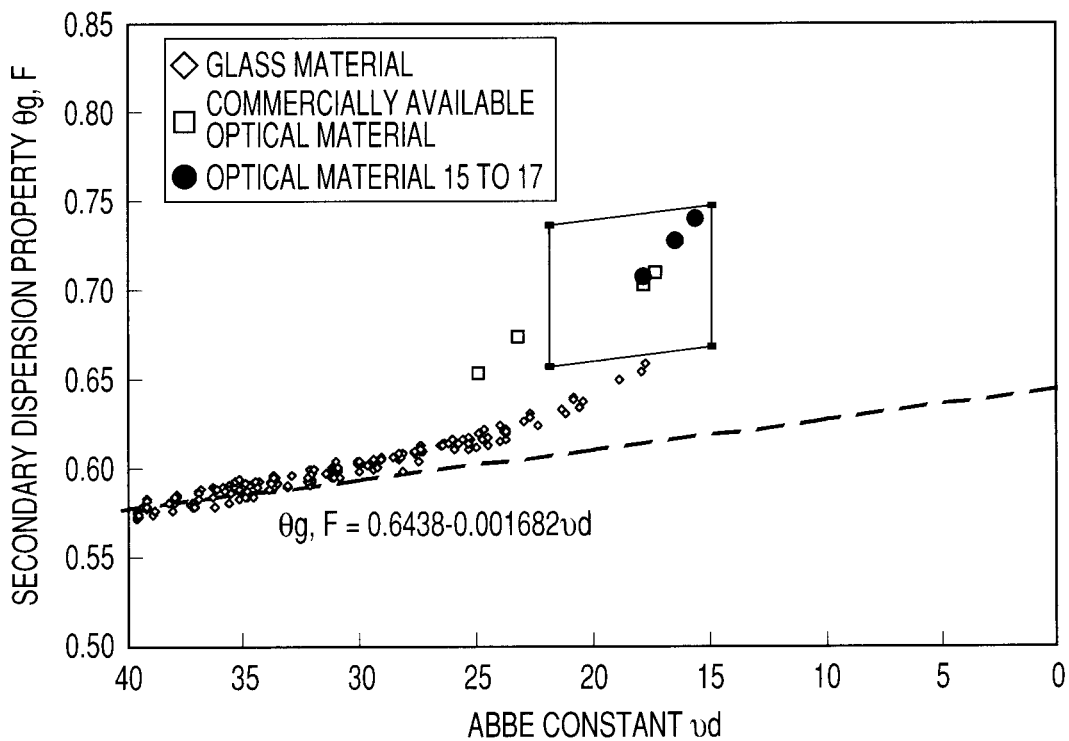
FIG. 4A is a graph illustrating a relationship between the Abbe constant and the secondary dispersion property in Example 2.
Figure 4B:
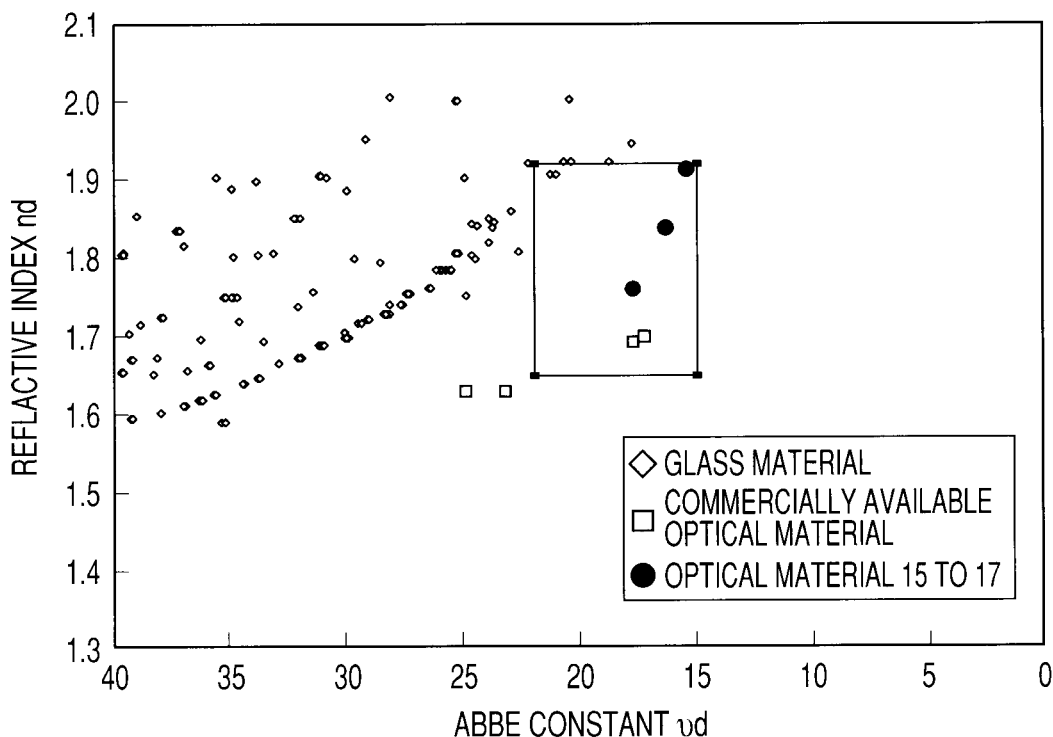
FIG. 4B is a graph illustrating a relationship between the Abbe constant and the refractive index in Example 2.

Relationships among the refractive index nd, the Abbe constant vd, and the secondary dispersion property θg,F in the molded members are illustrated in Table 2 and FIGS. 4A and 4B. When the difference between the secondary dispersion property θg,F in this example and the secondary dispersion property θg,F in (Expression 1) described above is expressed by Δθg,F, the secondary dispersion property difference Δθg,F of each of the optical materials 15 to 17 is in a range of 0.09≤Δθg,F≤0.13. The refractive index nd is in a range of 1.76≤nd≤1.92. The Abbe constant vd is in a range of 15≤vd≤18.

COMPARATIVE EXAMPLE 1

The sulfur-containing compound, bis(4-vinylthiophenyl) sulfide (MPV) was added with a photo radical polymerization initiator, 2-hydroxy-2-methyl-1-phenyl-propan-1-one at 3% by weight, and compatibly mixed therewith to obtain an optical material 18.

Figure 5A:
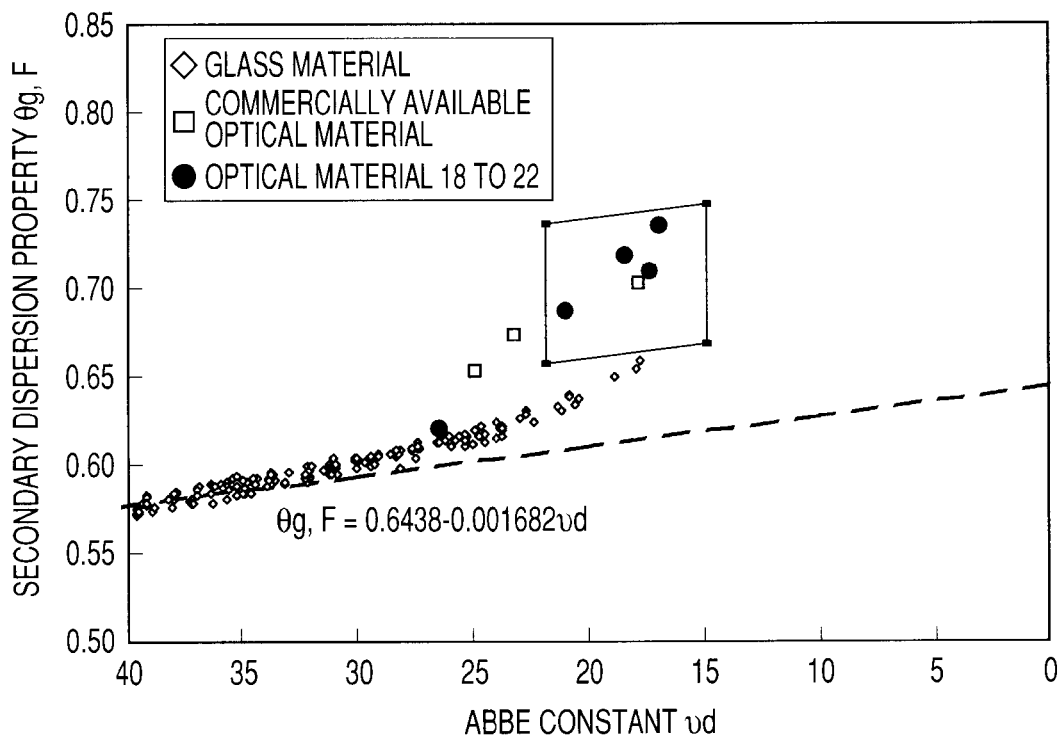
FIG. 5A is a graph illustrating a relationship between the Abbe constant and the secondary dispersion property in Comparative Examples 1 to 3.
Figure 5B:
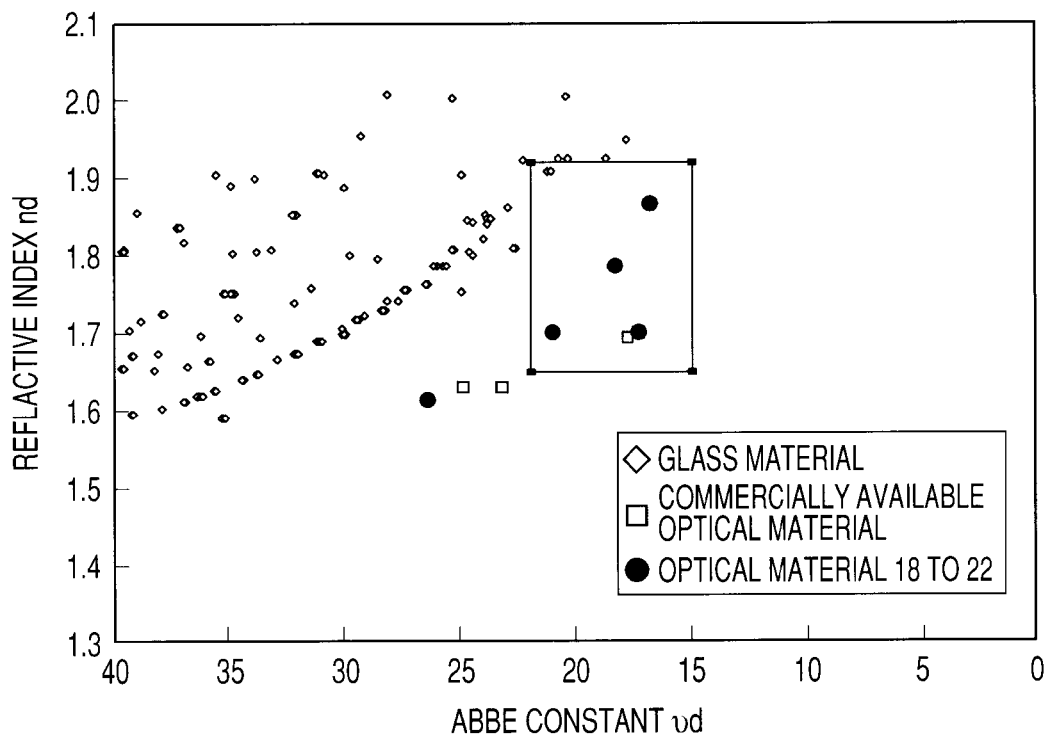
FIG. 5B is a graph illustrating a relationship between the Abbe constant and the refractive index in Comparative Examples 1 to 3.

In the same manner as in Example 1, a molded member having a thickness of 1 mm was obtained from the optical material 18 and then annealed. Relationships among the refractive index nd, the Abbe constant vd, and the secondary dispersion property θg,F in the molded members are illustrated in FIGS. 5A and 5B. An internal transmittance of the optical material 18 was measured. A result obtained by measurement is illustrated in Table 2.

COMPARATIVE EXAMPLE 2

The compound expressed by the chemical formula (1) was added with a photo radical polymerization initiator, 2-hydroxy-2-methyl-1-phenyl-propan-1-one at 3% by weight, and compatibly mixed therewith to obtain an optical material 19.

In the same manner as in Example 1, a molded member having a thickness of 1 mm was obtained from the optical material 19 and then annealed. Relationships among the refractive index nd, the Abbe constant vd, and the secondary dispersion property θg,F in the molded members are illustrated in FIGS. 5A and 5B. An internal transmittance of the optical material 19 was measured. A result obtained by measurement is illustrated in Table 2.

COMPARATIVE EXAMPLE 3

In the same manner as in Example 2, the optical material 19 obtained in Comparative Example 2 was added with the $TiO_2$ fine particle dispersion slurry adjusted in Example 2. A volume ratio of the $TiO_2$ fine particle to the optical material 19 was adjusted so as to be 5% by volume, 10% by volume, and 15% by volume. Then, optical materials 20, 21, and 22 were obtained.

In the same manner as in Example 1, molded members having a thickness of 1 mm were obtained from the optical materials 20, 21, and 22 and then annealed. Relationships among the refractive index nd, the Abbe constant vd, and the secondary dispersion property θg,F in the molded members are illustrated in FIGS. 5A and 5B. An internal transmittance and an optical scattering rate of each of the optical materials 20, 21, and 22 were measured. Results obtained by measurement are illustrated in Table 2.

TABLE 2

| | | Optical properties | | | | | | | |
|---|---|---|---|---|---|---|---|---|---|
| | Materials | nd | vd | θg, F | Δθg, F | $TiO_2$ content (volume %) | Optical property determination | Transmittance | Optical scattering rate | Total determination |
| Example 1 | Optical material 11 | 1.6694 A | 21.49 A | 0.661 | 0.053 A | — | A | A | — | A |
| | Optical material 12 | 1.6776 A | 20.59 A | 0.668 | 0.059 A | | | | | |
| | Optical material 13 | 1.6819 A | 20.11 A | 0.674 | 0.064 A | | | | | |
| | Optical material 14 | 1.6851 A | 19.71 A | 0.674 | 0.063 A | | | | | |

TABLE 2-continued

| | | Optical properties | | | | | | | |
|---|---|---|---|---|---|---|---|---|---|
| | Materials | nd | vd | θg, F | Δθg, F | TiO$_2$ content (volume %) | Optical property determination | Transmittance | Optical scattering rate | Total determination |
| Example 2 | Optical material 15 | 1.7625 AA | 17.86 AA | 0.708 | 0.094 AA | 5 | AA | B | A | A |
| | Optical material 16 | 1.8395 AA | 16.53 AA | 0.728 | 0.112 AA | 10 | | | | |
| | Optical material 17 | 1.9135 AA | 15.66 AA | 0.741 | 0.124 AA | 15 | | | | |
| Comparative Example 1 | Optical material 18 | 1.7018 A | 17.40 AA | 0.710 | 0.095 AA | — | A | C | — | C |
| Comparative Example 2 | Optical material 19 | 1.6150 B | 26.53 C | 0.621 | 0.022 C | — | C | AA | — | C |
| Comparative Example 3 | Optical material 20 | 1.7020 A | 21.09 A | 0.687 | 0.079 A | 5 | A | B | C | C |
| | Optical material 21 | 1.7848 AA | 18.47 A | 0.719 | 0.106 AA | 10 | | | | |
| | Optical material 22 | 1.8639 AA | 16.95 AA | 0.736 | 0.121 AA | 15 | | | | |

(Internal Transmittance and Optical Scattering Rate)

The internal transmittance and optical scattering rate were measured as follows.

(1) Internal Transmittance

Figure 6:
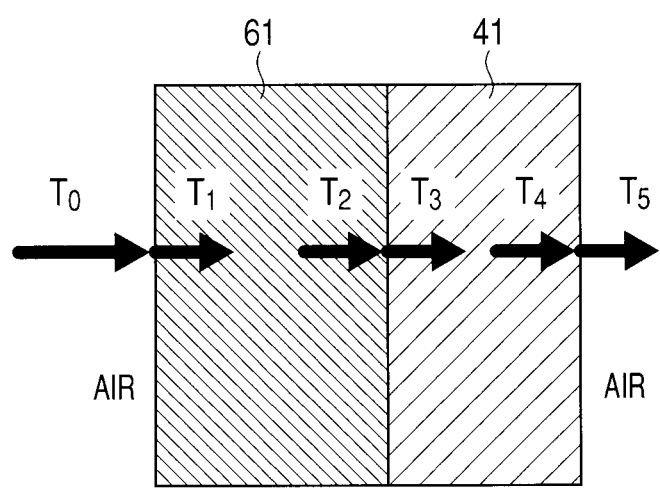
FIG. 6 is a schematic explanatory view illustrating a method of measuring an internal transmittance.

As illustrated in FIG. 6, the internal transmittance of the molded member 61 which has the thickness of 1 mm and is molded on the glass substrate 41 as described in Example 1 was measured together with the glass substrate 41. A value obtained by removing, from a measurement value, a variation in transmittance which is caused by the glass substrate, is the internal transmittance of the molded member.

In a case of incident light (T0), measured transmitting light (T5), a refractive index (n1) of the molded member, a refractive index (n2) of the glass substrate, the internal transmittance of the molded member alone was obtained by the following expression.

Internal transmittance of molded member(%)=$T5/(n01t \times n12t \times n20t)$ where $n01t$ is a transmittance factor on an interface between the molded member and air, $n01t=((n1-1)/(n1+1))^2$, $n12t$ is a transmittance factor on an interface between the molded member and the glass substrate, $n12t=((n2-n1)/(n2+n1))^2$, $n20t$ is a transmittance factor on an interface between the glass substrate and air, and $n20t=((1-n2)/(1+n2))^2$.

(2) Optical Scattering Rate

The optical scattering rate of the molded member which has the thickness of 1 mm and is molded on the glass substrate as described in Example 1 was measured together with the glass substrate by a spectrophotometer (U-4000, produced by Hitachi, Ltd.). A value obtained by removing, from a measurement value, a variation in optical scattering rate which is caused by the glass substrate, is the optical scattering rate of the molded member. That is, a relationship "(optical scattering rate of molded member)=(measured scattering rate)−((scattering rate of glass substrate)×(measured transmittance of molded member)/(measured transmittance of glass substrate))" is obtained.

According to the optical material of the present invention, when the flat-shaped mold as illustrated in FIGS. 2A to 2D is formed into a desired shape, the optical element may be manufactured. In this case, a molding condition may be made substantially equal to the condition described in Example 1.

Table 2 illustrated three values of the optical properties (refractive index, Abbe constant, secondary dispersion property difference) of the optical materials which were obtained in the examples and comparative examples. The three values were evaluated using "AA", "A", "B", and "C". When a refractive index is 1.75 or more, "AA" was used. When the refractive index is 1.65 or more to less than 1.75, "A" was used. When the refractive index is 1.55 or more to less than 1.65, "B" was used. When the refractive index is less than 1.55, "C" was used. When an Abbe constant is less than 18, "AA" was used. When the Abbe constant is 18 or more to less than 22, "A" was used. When the Abbe constant is 22 or more to less than 26, "B" was used. When the Abbe constant is 26 or more, "C" was used. When a secondary dispersion property difference Δθg,F is 0.09 or more, "AA" was used. When the secondary dispersion property difference is 0.05 or more to less than 0.09, "A" was used. When the secondary dispersion property difference is 0.03 or more to less than 0.05, "B" was used. When the secondary dispersion property difference is less than 0.03, "C" was used. The optical property determination was total determination based on the results of the refractive index, the Abbe constant, and the secondary dispersion property. If all of three values of the optical properties were AA, the optical property determination was AA. At least one of three values of the optical properties were C, the optical property determination was C. At least one of three values of the optical properties were B and not C, the optical property determination was B. Others were A.

With respect to the determination of the internal transmittance, when an internal transmittance at a wavelength of 430 nm is 85% or more to 100% or less, "AA" was used. When the internal transmittance is 75% or more to less than 85%, "A" was used. When the internal transmittance is 55% or more to less than 75%, "B" was used. When the internal transmittance is less than 55%, "C" was used. With respect to the determination of the optical scattering rate, when a scattering rate at a wavelength of 400 nm is less than 6%, "A" was used. When the scattering rate is 6% or more, "C" was used.

The internal transmittance of the optical material 18 of Comparative Example 1 was less than 85%, which was insufficient as an optical material transmittance. The secondary dispersion property difference $\Delta\theta g,F$ of the optical material 19 of Comparative Example 2 was as small as 0.022, and thus it may not be said that the optical material 19 has the sufficient optical properties. A manufacturing cost thereof is high.

The optical scattering rate of each of the optical materials 20 to 22 of Comparative Example 3 is very small. Therefore, "C" was used for determination. This result may be caused by a large refractive index difference between the refractive index of the optical material 19 which is the organic resin added with the fine particles and the refractive index of the TiO$_2$ fine particles. The refractive index of the optical material 13 used in Example 2 is larger than the refractive index of the optical material 19 and smaller than the refractive index of the TiO$_2$ fine particles, and hence an excellent optical scattering property is exhibited.

The determination of the optical scattering rate was performed only on the optical materials 15 to 17 and 20 to 22, each including the fine particles. With respect to the total determination of the optical materials of the respective examples and comparative examples, "A" was basically used unless "C" is not included in an optical property box, an internal transmittance box, and an optical scattering rate box.

In order to determine environmental reliability, each of the molded members obtained in Examples 1 and 2 was left at a temperature of 60° C. and a humidity of 90% for 800 hours to observe variations in the properties described above. As a result, large variations in respective properties were not observed.

Therefore, it was confirmed that the respective optical materials according to the example of the present invention have the high transmittance and the low optical scattering property and further have the high refractive index, the low Abbe constant, and the high secondary dispersion property. In addition, it was also confirmed that the respective optical materials according to the examples have the excellent environmental reliability and are useful as a desired optical element material.

are exhibited, and hence the chromatic aberration may be efficiently removed. Thus, when a refraction optical element having an aspherical shape is formed, such an optical element may be used as an optical element with a chromatic aberration correction function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2008-243190, filed Sep. 22, 2008, and 2009-197418, filed Aug. 27, 2009, which are hereby incorporated by reference herein in their entirety.

What is claimed is:

1. An optical material comprising a co-polymer,
    wherein the co-polymer: is a co-polymer of a bis(4-vinylthiophenyl)sulfide and a fluorene compound at least having a fluorene skeleton, and,
    wherein a content of the bis(4-vinylthiophenyl)sulfide is 30% by weight or more to 85% by weight or less, and a content the fluorene compound is 15% by weight or more to 70% by weight or less in the co-polymer.

2. The optical material according to claim 1, wherein:
    the co-polymer has a refractive index of 1.65 or more to less than 1.92 and an Abbe constant of 15 or more to less than 22; and
    a difference $\Delta\theta g,F$ between a secondary dispersion property $\theta g,F$ of the co-polymer and a secondary dispersion property $\theta g,F$ expressed by the following expression is 0.05 or more to less than 0.13, $$\theta g,F = 0.6438 - 0.001682 \nu d$$

where $\nu d$ is an Abbe constant.

3. The optical material according to claim 1, wherein the fluorene compound has a fluorene skeleton represented by the chemical formula (1):

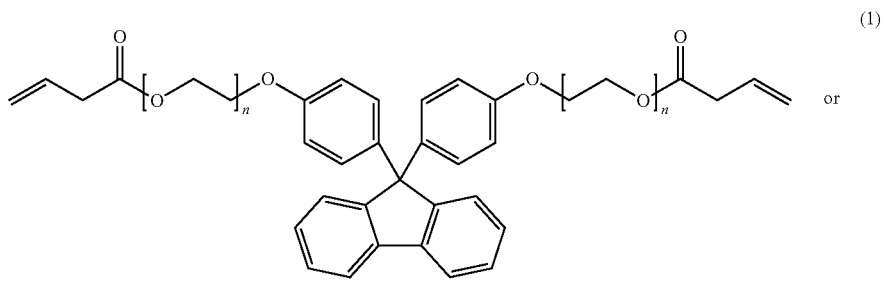

(1)

the chemical formula (2):

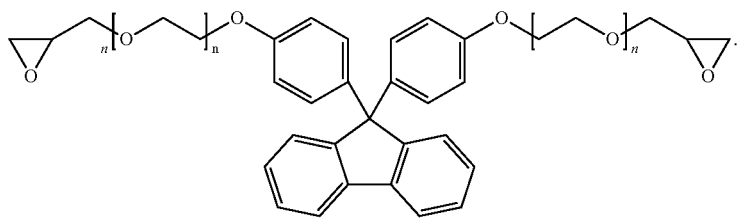

(2)

According to the optical material of the present invention, the material cost is low, and the high transmittance, the low optical scattering property, the high refractive index, the low Abbe constant, and the high secondary dispersion property 4. An optical material comprising a co-polymer and metal oxide fine particles, wherein the co-polymer is a co-polymer of a bis(4-vinylthiophenyl) sulfide and a fluorene compound at least having a fluorene skeleton, and a content of the bis(4-vinylthiophenyl)sulfide is 30% by weight or more to 85% by weight or less, and a content of the fluorine compound is 15% by weight or more to 70% by weight or less in the co-polymer.

5. The optical material according to claim 4, wherein:
the co-polymer has a refractive index of 1.65 or more to less than 1.92 and an Abbe constant of 15 or more to less than 22; and
a difference $\Delta\theta g,F$ between a secondary dispersion property $\theta g,F$ of the co-polymer and a secondary dispersion property $\theta g,F$ expressed by the following expression is 0.05 or more to less than 0.13, $$\theta g,F = 0.6438 - 0.001682 vd$$

where vd is an Abbe constant.

6. The optical material according to claim 4, wherein the fluorene compound has a fluorene skeleton represented by the chemical formula (1):

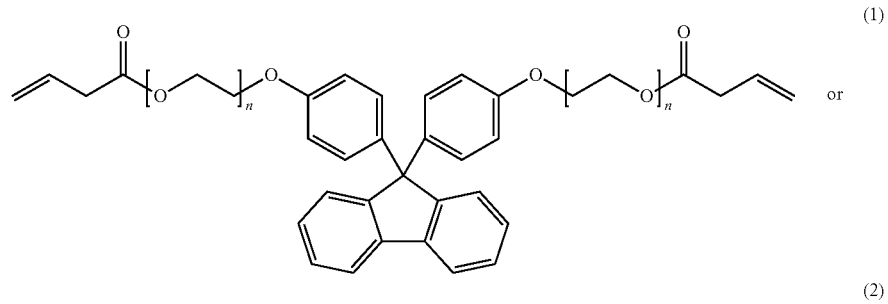

(1)

the chemical formula (2):

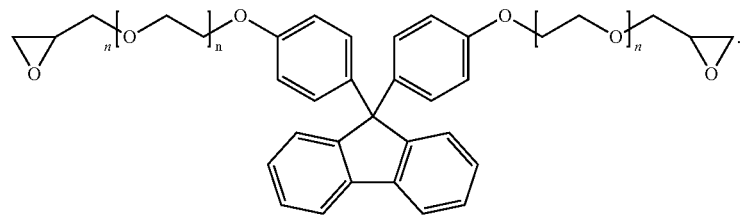

(2)

7. The optical material according to claim 4, wherein the metal oxide fine particles comprise at least one selected from the group consisting of a titanium oxide, a niobium oxide, a tantalum oxide, and a tungsten oxide.

8. The optical material according to claim 4, wherein the metal oxide fine particles have an average particle diameter of 30 nm or less and a median diameter D95 of 30 nm or less.

9. An optical element obtained by the optical material according to claim 1, wherein an optical scattering rate of the optical element to light having a wavelength of 430 nm in a thickness of 0.01 µm or more to 1 mm or less is larger than 0.1% and smaller than 6.0%.

10. An optical element obtained by optical material according to claim 4, wherein an optical scattering rate of the optical element to light having a wavelength of 430 nm in a thickness of 0.01 µm or more to 1 mm or less is larger than 0.1% and smaller than 6.0%.

* * * * *